UNITED STATES PATENT OFFICE.

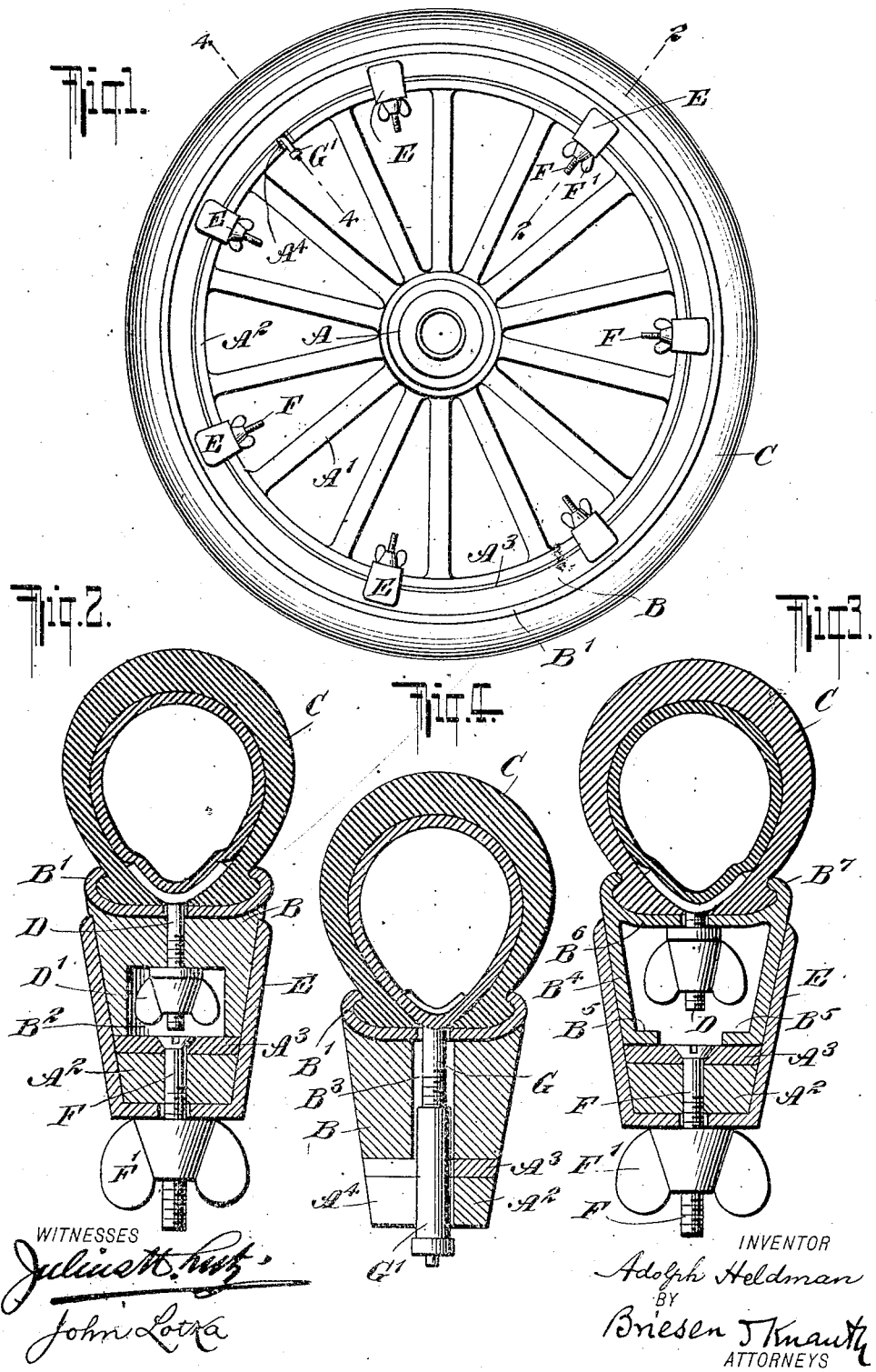

ADOLPH HELDMAN, OF NEW YORK, N. Y.

AUTOMOBILE-WHEEL.

No. 863,848.

Specification of Letters Patent.

Patented Aug. 20, 1907.

Application filed September 19, 1906. Serial No. 335,217.

To all whom it may concern:

Be it known that I, ADOLPH HELDMAN, a citizen of the United States, and a resident of the borough of Manhattan, city, county, and State of New York, have invented certain new and useful Improvements in Automobile-Wheels, of which the following is a specification.

My invention relates to wheels having detachable tires, and particularly to automobile wheels.

The object of my invention is to provide a rim of improved construction which will enable a tire to be removed and a new one to be substituted in a very short time.

The invention will be fully described hereinafter and the features of novelty pointed out in the appended claims.

Reference is to be had to the accompanying drawings, in which

Figure 1 is a face view of a wheel embodying my invention, Fig. 2 is a cross-section on line 2—2 of Fig. 1; Fig. 3 is a similar cross-section of another form of my invention, and Fig. 4 is a cross-section on line 4—4 of Fig. 1.

From the wheel hub A the spokes A' run to the main rim $A^2$ which, when made of wood, is preferably encircled by a metal band $A^3$. Any suitable construction may be adopted for this inner portion of the wheel.

Around the main rim composed of the members $A^2$, $A^3$, is fitted the auxiliary tire-carrying rim B, provided with a holding member B' for the tire C. The tire may be fastened to this auxiliary rim in any suitable way; I have shown the well-known screw-lugs D on which fit wing-nuts D' located in recesses $B^2$ of the auxiliary rim. The main rim $A^2$, $A^3$ and the auxiliary rim may be tapered from the periphery toward the hub as shown in Figs. 2, 3 and 4. It will be seen that the auxiliary rim B, with the tire C attached thereto, may be slipped on or off the main rim $A^2$, $A^3$, in a direction parallel to the wheel's axis.

In order to detachably secure the auxiliary rim in position, I may employ any suitable device; in the drawings I have shown flaring fasteners E arranged to clasp both rims, said fasteners straddling the inner or main rim and embracing the auxiliary rim. Screws F extend inwardly from the main rim at suitable intervals; the fasteners E have holes so that they may be fitted over said screws, and wing nuts F' are employed to press the fasteners outward so as to wedge them over the sides of the two rims. When it is desired to remove the auxiliary rim with the tire, the wing nuts F' are screwed off, whereupon the fasteners E are removed inwardly, that is toward the hub, and the auxiliary rim can be forced off by pushing it sidewise, that is parallel to the wheel's axis. The reverse operation is employed to put a new rim and tire on the wheel. Both operations can be effected in a very short time, this affording a valuable convenience for repairs, especially during races.

As regards the valve G of the tire, it may be so arranged as to be received entirely (together with its cap) in the auxiliary rim B, in a chamber $B^3$ registering with a suitable aperture in the main rim. When desired, the valve or at least its cap may project inwardly from the auxiliary rim, and if the valve itself is so projected, it becomes necessary to provide a lateral cut-out $A^4$ in the main rim so that the valve and cap may be placed in position as the auxiliary rim is slipped on. The simplest and best construction would probably be to have the valve G contained entirely within the chamber $B^3$, while an extra long cap G' of the character shown in Fig. 4 would be used, which cap would project inwardly from the main rim. This may necessitate a special pump connection to inflate the tire, but will avoid the weakening of the main rim by the lateral cut-out $A^4$, since in this case an aperture or chamber simply forming a continuation of the chamber $B^3$ will be sufficient.

In Figs. 1, 2 and 4 the auxiliary rim consists of two portions, the inner member B being made of wood and the tire-holding outer member B' of metal. An all-metal construction is illustrated in Fig. 3, where the auxiliary rim made of one piece, has converging members $B^4$ provided at their inner ends with flanges $B^5$ to engage the main rim. At the outer portion there is a tire-seating member $B^6$ which with the hooks $B^7$ forms the equivalent of the tire-holding member B' of Figs. 1, 2 and 4. In other respects the construction is the same as that first described.

As a further safeguard against the creeping of the auxiliary rim B, some or all of the fasteners E may be made to engage grooves of both rims, as indicated in Fig. 2.

I claim as my invention:

1. In a wheel the combination of a main rim and auxiliary rim adapted to fit around the main rim and arranged to carry a tire, both rims being tapered toward the wheel's axis, fasteners arranged to straddle the main rim and to embrace the auxiliary rim, and means for holding said fasteners.

2. In a wheel, the combination of a main rim, an auxiliary tire-carrying rim adapted to fit around the main rim, both rims being tapered toward the wheel's axis, outwardly-flaring fasteners arranged to straddle the main rim and to embrace the auxiliary rim, and means for pressing said fasteners outward.

3. In a wheel, the combination of a main rim, an auxiliary tire-carrying rim adapted to fit around the main rim, both rims being tapered toward the wheel's axis, and fasteners for detachably connecting the two rims.

In testimony whereof I have hereunto signed my name in the presence of two subscribing witnesses.

ADOLPH HELDMAN.

Witnesses:
JOHN LOTKA,
JOHN A. KEHLENBECK.